United States Patent [19]
Converse, Jr. et al.

[11] Patent Number: 5,380,209

[45] Date of Patent: Jan. 10, 1995

[54] TRAILER LIGHT CONNECTOR ENCLOSURE

[76] Inventors: Carroll H. Converse, Jr., 318 Jones St., Pineville, La. 71360; James A. Hayes, 6897 Esler Rd., Pineville, La. 71360

[21] Appl. No.: 132,814

[22] Filed: Oct. 7, 1993

[51] Int. Cl.6 .......................................... H01R 33/00
[52] U.S. Cl. ..................................... 439/35; 280/422
[58] Field of Search ............. 439/35, 36, 34, 501, 439/503, 504; 280/422; 307/10.8; 191/12.1, 12.2, 12.4

[56] References Cited

U.S. PATENT DOCUMENTS

| | | | |
|---|---|---|---|
| 2,730,183 | 1/1956 | Svoboda | 280/422 X |
| 4,781,393 | 11/1988 | Jeter | 439/35 X |
| 4,940,427 | 7/1990 | Pearson | 439/501 |
| 5,056,698 | 10/1991 | Kozakevich | 191/12.2 R X |
| 5,129,828 | 7/1992 | Bass | 439/35 |

Primary Examiner—Eugene F. Desmond
Attorney, Agent, or Firm—John M. Harrison

[57] ABSTRACT

A trailer light connector enclosure which is characterized by an enclosure housing attached to either the frame, bumper or trailer hitch of a towing vehicle or the trailer tongue of a trailer and fitted with a removable or hinged door or closure and one or more slots, for receiving the plug or plug receptacle of the trailer or vehicle to enclose and secure the plug or plug receptacle when the plug or plug receptacle is not in use. In a preferred embodiment the trailer light connector enclosure is characterized by a notched housing of suitable shape, fitted with a hinged closure and an adhesive backing for mounting the housing on the vehicle or trailer, such that the plug or receptacle can be enclosed inside the housing when not in use and removed or extended from the housing for connection to the corresponding plug or plug receptacle component by opening the closure.

20 Claims, 2 Drawing Sheets

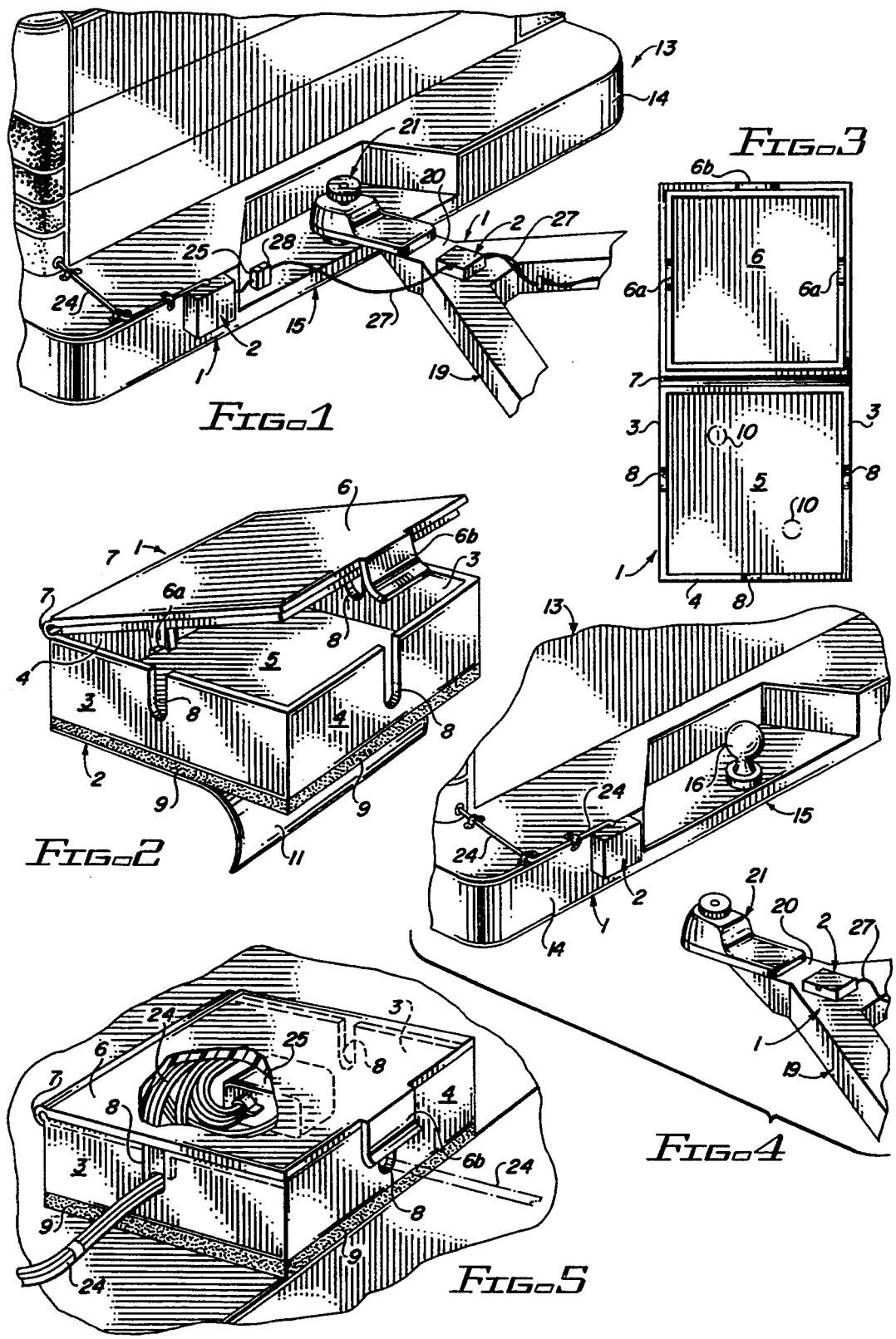

TRAILER LIGHT CONNECTOR ENCLOSURE

BACKGROUND OF THE INVENTION

1. Field of the Invention

This invention relates to lighting attachments for trailers and vehicles and more particularly, to a trailer light connector enclosure which may be secured to the bumper, frame or trailer hitch of a towing vehicle or to the tongue or coupler of a trailer by means of an adhesive backing in one embodiment, and utilized to enclose and protect the plug or plug receptacle elements of a conventional trailer light wiring harness when the vehicle is not towing the trailer. Alternatively, the rewind trailer light connector can be secured to the vehicle or trailer by means of bolts or other fasteners in close proximity to the plug or receptacle component, to facilitate removal or extension of the plug or plug receptacle from the housing for connection to a mating plug or receptacle when a trailer is coupled to the vehicle.

Cars, trucks and other vehicles are frequently used to pull trailers of various description and it is therefore necessary for safety purposes to interconnect the brake lights, turn signal indicators and running lights of the towing vehicle with corresponding lights on the trailer. Various types of wiring harnesses and interconnecting plug and plug receptacles are used to achieve this purpose, most of which including a wiring plug attached to the trailer wiring and a corresponding socket or receptacle connected to the vehicle wiring harness.

A common problem realized in the installation of wiring harnesses in towing vehicles and trailers for the purpose of attaching the wiring harnesses to corresponding trailer wiring when towing a trailer, is that of securing the vehicle and trailer wiring harness plug and receptacle in a convenient location when the trailer is disconnected from the vehicle. These plugs and receptacles, along with a connecting length of wiring harness, usually dangle or trail behind the vehicle as the vehicle is operated and from the trailer tongue when the trailer is not attached to the vehicle trailer hitch. The plug and receptacle are therefore frequently damaged by movement of the trailer, as well as contact with the road surface or the frame of the towing vehicle, or the plug may be coated with road film, mud and asphalt or oil while traveling. The dangling plug also detracts from the overall streamlining and positive esthetic appearance of the towing vehicle.

2. Description of the Prior Art

Attempts to minimize or eliminate damage due to trailing plugs or receptacles attached to the ends of wiring harnesses in vehicles, include wrapping the wiring around the vehicle trailer hitch or otherwise shortening the length of the wiring harness adjacent to the plug or receptacle to prevent the plug or receptacle from being damaged by movement of the trailer tongue or contact with the road or the vehicle or excessively coated with undesirable road elements. These efforts frequently cause the wiring to crimp or stretch, sometimes making it inoperative, and at best, the randomly dangling plug presents an unsightly appearance and detracts from the vehicle. U.S. Pat. No. 4,940,427, dated Jul. 10, 1990, to Linnea H. Pearson, details an "Electrical Trailer Connector Retainer". The retainer is designed for use with an electrical wire connector of the type commonly used to provide electrical connection of a trailer device to the electrical system of a towing vehicle. The device is mountable either on the bumper of the towing vehicle or the tongue of the trailer and permits the electrical wire connector used for transferring electrical power to the trailer from the electrical supply system of the towing vehicle, to be safely and conveniently stowed or retained when not in use and readily available for electrical connection when needed. U.S. Pat. No. 5,129,828, dated Jul. 14, 1992, to Chauncie L. Bass, details a "Rewind Trailer Light Connector" which includes a rewind housing connected to a vehicle frame or trailer tongue and fitted with a spring-loaded rewind mechanism for storing electrical wiring and the plug or plug receptacle.

It is an object of this invention to provide a trailer light connector enclosure for removably enclosing the plug or plug receptacle of the electrical lighting system of a towing vehicle or a trailer to be towed.

Another object of the invention is to provide trailer light connector enclosures which serve to removably enclose the plug and plug receptacle wiring connectors wired into the electrical lighting systems of a towing vehicle and a trailer, wherein the wiring connectors and the wiring immediately adjacent to each wiring connector are selectively enclosed in a separate enclosure to protect the disconnected plug and receptacle, respectively, of the electrical lighting system of the trailer and vehicle.

Yet another object of this invention is to provide a trailer light connector enclosure having a closeable, notched or slotted housing which may be installed either on a towing vehicle or on a trailer to removably enclose the wiring plug or receptacle on the trailer or vehicle, thereby preventing damage to, or road film encrustation of, the plug or plug receptacle attached to the vehicle or trailer wiring enclosed in the housing.

Still another object of this invention is to provide a notched trailer light connector enclosure housing closed by a removable or hinged lid, door or closure, which housing is attached to a trailer tongue or coupler or to a bumper, trailer hitch or vehicle frame and is sized to accommodate a first trailer light connector located on the towing vehicle or a second trailer light connector located on the trailer, for protecting the connectors from damage, road film and like hazards when the trailer is uncoupled from the vehicle.

SUMMARY OF THE INVENTION

These and other objects of the invention are provided in a trailer light connector enclosure which may be secured to the bumper, frame or trailer hitch of a towing vehicle or a trailer by means of an adhesive or by using fasteners, which enclosure includes a housing provided with a threaded or hinged lid, door or closure for enclosing the wiring plug or plug receptacle attached to the vehicle or trailer wiring when the trailer is not secured to the towing vehicle. In a preferred embodiment the housing is fitted with an entrance opening and a notch, slot or exit opening to accommodate harness wiring attached to the plug or receptacle and an adhesive backing which is exposed by a peel strip, for securing the housing to the vehicle or trailer. The lid, door or closure of the trailer light connector enclosure may alternatively be provided with a slot or opening for receiving the wiring connected to the plug or receptacle and the trailer light connector enclosure may be mounted at any convenient location on the trailer tongue or coupler of the trailer or on the trailer hitch, bumper or frame of the towing vehicle.

BRIEF DESCRIPTION OF THE DRAWING

The invention will be better understood by reference to the accompanying drawing, wherein:

FIG. 1 is a perspective view of a first preferred embodiment of the trailer light connector enclosure of this invention mounted on the bumper of a vehicle, wherein a trailer is coupled to the vehicle and the trailer wiring plug is inserted in the vehicle wiring receptacle;

FIG. 2 is a perspective view of the trailer light connector enclosure illustrated in FIG. 1;

FIG. 3 is a top view of the trailer light connector enclosure illustrated in FIGS. 1 and 2, in fully open configuration;

FIG. 4 is a perspective view of the trailer light connector enclosures with the vehicle wiring receptacle and trailer wiring receptacle enclosed therein, respectively;

FIG. 5 is a perspective view, partially in section, of the trailer light connector enclosure, partially in section, illustrating the vehicle wiring receptacle enclosed therein;

DESCRIPTION OF THE PREFERRED EMBODIMENTS

Figure 6:
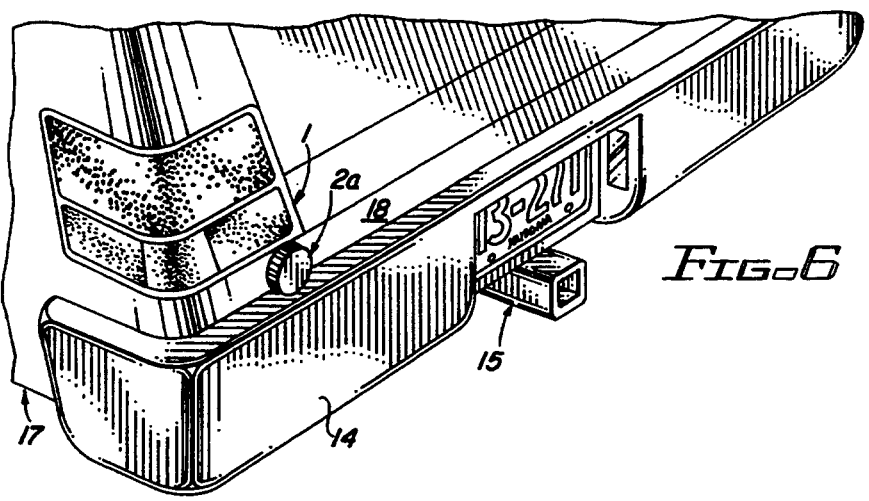
FIG. 6 is a perspective view of an alternative preferred embodiment of the trailer light connector enclosure mounted on an automobile.
Figure 7:
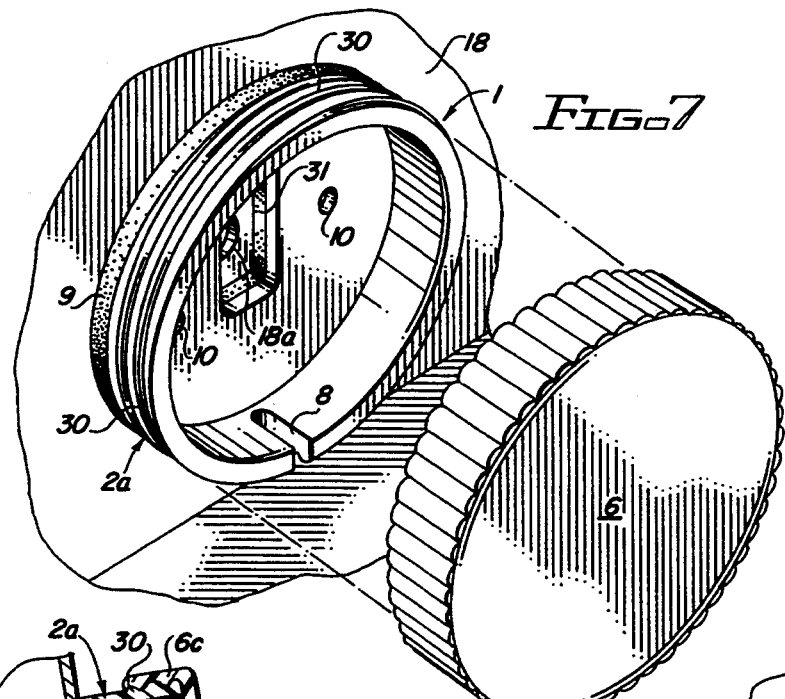
FIG. 7 is an exploded view of the trailer light connector enclosure illustrated in FIG. 1.

Referring initially to FIGS. 1-5 of the drawings, a first embodiment of the trailer light connector enclosure of this invention is generally illustrated by reference numeral 1 and includes a box-like enclosure housing 2, defined by parallel housing sides 3, housing ends 4, a housing bottom 5 and a lid or closure 6, having closure tabs 6a and a closure clip 6b, which closure 6 closes the top of the enclosure housing 2. In a most preferred embodiment the closure 6 is attached to an edge of one of the housing sides 3 of the enclosure housing 2 by means of a closure hinge 7 and wiring access slots 8 are provided in one of the housing ends 4 and the housing sides 3, as illustrated in FIGS. 2 and 3. In another preferred embodiment of the invention an adhesive 9 is provided on the housing bottom 5 of the enclosure housing 2 and is accessed by a peel strip 11, as illustrated in FIG. 2, to secure the enclosure housing 2 on the bumper 14 or trailer hitch bar 15, of the truck 13. Alternatively, mount openings 10 can be provided in the housing bottom 5 for insertion of fasteners (not illustrated) to mount the enclosure housing 2 to the bumper 14 of the truck 13, as illustrated in FIG. 3. The trailer hitch bar 15 is equipped with a conventional hitch ball 16 and it will be appreciated by those skilled in the art that the enclosure housing 2 may be alternatively mounted on the trailer hitch bar 15 or the bumper of the truck 13 in any convenient location in close proximity to the wiring receptacle 25 and the vehicle wiring 24, as further illustrated in FIG. 1. Accordingly, it will be appreciated from a consideration of FIGS. 1-5 that the vehicle wiring receptacle 25 can be inserted in the enclosure housing 2 after opening the closure 6 on the closure hinge 7 and the closure 6 then closed on the closure hinge 7 to enclose and protect the wiring receptacle 25 and a selected length of vehicle wiring 24 inside the enclosure housing 2. Vehicle wiring 24 located immediately adjacent to the wiring receptacle 25 extends through the wiring access slot 8 in one of the housing sides 3 of the enclosure housing 2, as further illustrated in FIG. 5, when the wiring receptacle 25 is so enclosed, and the closure tab 6a serves to recess and stabilize the vehicle wiring 24 in the wiring access slot 8 to prevent vibration of the vehicle wiring 24. The vehicle wiring 24 can be inserted in a wiring access slot located in one of the housing ends 4 or in the remaining housing side 3, to connect the wiring plug 28 to the wiring receptacle 25 when the trailer 19 is coupled to the hitch ball 16 as illustrated in FIG. 1 and in phantom in FIG. 5.

Referring now to FIGS. 1 and 4 of the drawings, in another preferred embodiment of the invention the trailer light connector enclosure 1 can be mounted on the trailer tongue 20 or coupler 21 of a trailer 19, in order to enclose the wiring plug 28, attached to the trailer wiring 27, extending from the trailer tongue 20, as illustrated. As described above, the enclosure housing 2 can be accessed by opening the closure 6 on the closure hinge 7 to accommodate the wiring plug 28, with the trailer wiring 27 extending through a selected wiring access slot 8 provided in one of the housing sides 3 of the enclosure housing 2 when the closure 6 is closed on the closure hinge 7, as illustrated in FIG. 4. The trailer wiring 27 can be extended through the wiring access slot 8 provided in the housing end 4 when the trailer 19 is coupled to the truck 13, to plug the wiring plug 28 into the wiring receptacle 25, as illustrated in FIG. 1.

Figure 8:
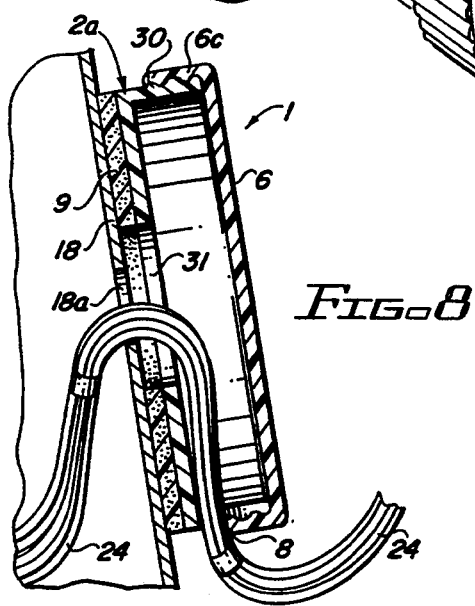
FIG. 8 is a side sectional view of the trailer light connector enclosure illustrated in FIG. 1, with the vehicle wiring receptacle extended therefrom.
Figure 9:
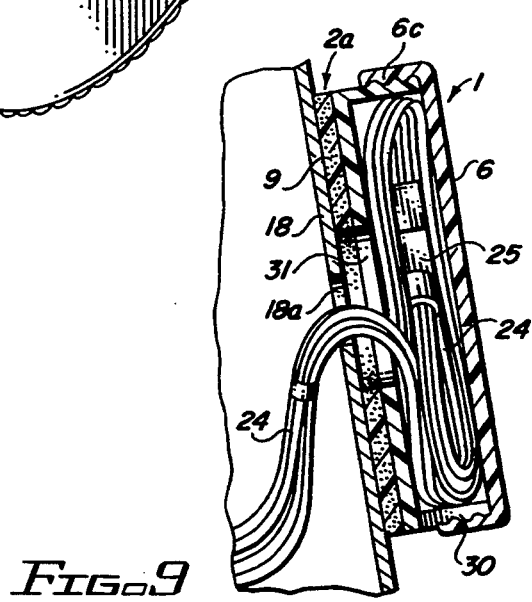
FIG. 9 is a side sectional view of the trailer light connector enclosure illustrated in FIG. 6, with the vehicle wiring receptacle enclosed therein.

Referring now to FIGS. 6-9 of the drawings, in an alternative embodiment of the invention the trailer light connecting enclosure 1 includes a round enclosure housing 2a, provided with external housing threads 30, a bottom access slot 31 and a wiring access slot 8. The enclosure housing 2a is closed by a threaded closure 6. Adhesive 9 and/or mount openings 10 may also be provided in the bottom of the round threaded enclosure housing 2a, for mounting on the body panel 18 of a car 17 at the panel opening 18a. The vehicle wiring 24 extends from the panel opening 18a in the body panel 18, through the bottom access slot 31 and the wiring receptacle 25 can selectively be located in the threaded enclosure housing 2a, as illustrated in FIG. 9, when the trailer 19 is not coupled to the car 17. Alternatively, the vehicle wiring 24 can be extended through the wiring access slot 8 to connect the wiring plug 28 to the wiring receptacle 25, as illustrated in FIG. 8, when the trailer 19 is coupled to the trailer hitch bar 15.

It will be appreciated by those skilled in the art that both of the trailer light connecting enclosures 1 of this invention offer a quick, easy and effective technique for enclosing and protecting the wiring receptacle 25 of the vehicle wiring 24 and the wiring plug 28 of the trailer wiring 27 when the trailer 19 is not connected to the truck 13 or car 17, respectively. In this manner the wiring plug 28 and wiring receptacle 25 are protected from inadvertent damage when in the non-trailering configuration. Furthermore, both enclosure designs may equally well be used on the truck 13, car 17 and the trailer 19, as desired.

It will be further appreciated by those skilled in the art that the enclosure housing 2 and threaded enclosure housing 2a need not be shaped in the configuration of a box or round container as illustrated in FIGS. 1 and 6, but may be shaped in any desired configuration and fitted with a closure 6 which positively seats in closed configuration on an enclosure housing 2 and encloses either the wiring receptacle 25 of the vehicle wiring 24, or the wiring plug 28 of the trailer wiring 27, inside the enclosure housing 2, as desired. Furthermore, the trailer light connector enclosures 1 may be constructed of any desired material, including metal, fiberglass and plastic material such as polyethylene, polypropylene or the like, in non-exclusive particular, according to the desires of those skilled in the art. Moreover, while the wiring access slots 8 are preferably located in one of the housing ends 4 and the housing sides 3, depending upon the shape of the enclosure housing 2, the wiring access slot(s) 8 may also be located in the closure 6, as deemed expedient. Alternatively, a single wiring access slot 8 may be provided in the enclosure housing 2 and threaded enclosure housing 2a of the trailer light connector enclosures 1 for accessing the wiring receptacle 25 and/or the wiring plug 28 in non-towing configuration and removing the wiring receptacle 25 and the wiring plug 28, as well as the connected vehicle wiring 24 and trailer wiring 27, from the respective enclosures when the trailer 19 is coupled to the truck 13 or car 17.

The trailer light connector enclosures of this invention offer a convenient, inexpensive and efficient technique for guarding and protecting the wiring receptacle 25 of the vehicle wiring 24 and the wiring plug 28 of the trailer wiring 28, to insure that the rear brake lights, turn signal indicators and night running lights in the electrical system of the trailer and the corresponding electrical system of the towing vehicle are in good running order whenever the trailer 19 is coupled to and towed by the truck 13 or car 17. The trailer light connector enclosures 1 eliminate the need for the common technique of winding the excessive vehicle wiring 24 around the hitch ball 16 and the trailer wiring 27 around the trailer tongue 20 or the coupler 21, in haphazard fashion, to prevent the wiring receptacle 25 and trailer wiring 28 from dangling. Moreover, the trailer light connector enclosures of this invention can be used in a wide variety of trailer hitch and coupler design applications and may be mounted in any desired configuration by means of the adhesive 9 and/or the mount openings 10, using suitable fasteners, in close proximity to the wiring receptacle 25 and wiring plug 28, respectively. In lieu of the adhesive applied directly to the bottom of the enclosure housing 2 and threaded enclosure housing 2a, a single adhesive applicator having dual peel strips (not illustrated) may be used for the purpose. Additionally, the wiring access slots 8 may be individually accessed by removing a perforated tab (not illustrated) to facilitate use of selected ones of the slots 8 or, alternatively, the trailer light connector enclosure 1 may be used with the tabs in place as a waterproof receptacle for boat registration and license documents, keys, and the like.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A trailer light connector enclosure for mounting on a vehicle and enclosing a trailer light connector provided on the vehicle wiring harness, comprising an enclosure housing sized to receive the trailer light connector, at least one opening provided in said enclosure housing for receiving the wiring harness attached to the trailer light connector and closure means removably carried by said enclosure housing for releasably closing the trailer light connector inside said enclosure housing.

2. The trailer light connector enclosure of claim 1 comprising hinge means carried by said enclosure housing and connected to said closure means for hingedly opening said closure means on said enclosure housing to access the trailer light connector and removably securing the trailer light connector inside said enclosure housing.

3. The trailer light connector of claim 1 comprising mounting means provided on said enclosure housing for securing said enclosure housing to the vehicle.

4. The trailer light connector enclosure of claim 3 wherein said at least one opening comprises two openings and said mounting means comprises adhesive and comprising a peel strip covering said adhesive, whereby said peel strip is removed prior to contacting said adhesive with the vehicle for securing said enclosure housing to the vehicle.

5. The trailer light connector enclosure of claim 2 comprising adhesive provided on said enclosure housing for securing said enclosure housing to the vehicle.

6. The trailer light connector enclosure of claim 5 wherein said at least one opening comprises two openings and comprising a peel strip covering said adhesive, whereby said peel strip is removed prior to contacting said adhesive with the vehicle for securing said enclosure housing to the vehicle.

7. The trailer light connector enclosure of claim 1 comprising fastening openings provided in said enclosure housing and fasteners extending through said fastening openings into the vehicle, for securing said enclosure housing to the vehicle.

8. The trailer light connector enclosure of claim 7 comprising hinge means carried by said enclosure housing and connected to said closure means for hingedly opening said closure means on said enclosure housing to access the trailer light connector and removably securing the trailer light connector inside said enclosure housing.

9. A trailer light connector enclosure for mounting on a trailer and enclosing a trailer light connector provided on the trailer wiring harness, comprising a round enclosure housing sized to receive the trailer light connector, at least one opening provided in said enclosure housing for receiving the wiring harness attached to the trailer light connector and a round closure means carried by said enclosure housing for releasably closing the trailer light connector inside said enclosure housing.

10. The trailer light connector enclosure of claim 9 comprising hinge means carried by said enclosure housing and connected to said closure means for hingedly opening said closure means on said enclosure housing to access the trailer light connector and removably securing the trailer light connector inside said enclosure housing.

11. The trailer light connector enclosure of claim 9 comprising mounting means provided on said enclosure housing for securing said enclosure housing to the trailer.

12. The trailer light connector enclosure of claim 11 wherein said mounting means comprises adhesive and comprising a peel strip covering said adhesive, whereby said peel strip is removed prior to contacting said adhesive with the trailer for securing said enclosure housing to the trailer.

13. The trailer light connector enclosure of claim 10 wherein said at least one opening comprises two openings and comprising adhesive provided on said enclosure housing for securing said enclosure housing to the trailer.

14. The trailer light connector enclosure of claim 13 comprising a peel strip covering said adhesive, whereby said peel strip is removed prior to contacting said adhesive with the trailer for securing said enclosure housing to the trailer.

15. The trailer light connector enclosure of claim 9 comprising threads provided on said enclosure housing and said closure means, whereby said closure means threadably closes on said enclosure housing.

16. The trailer light connector enclosure of claim 15 wherein said at least one opening comprises two openings provided in spaced relationship with respect to each other in said enclosure housing.

17. The trailer light connector enclosure of claim 15 comprising adhesive provided on said enclosure housing for securing said enclosure housing to the trailer.

18. The trailer light connector enclosure of claim 17 wherein said at least one opening comprises two openings provided in spaced relationship with respect to each other in said enclosure housing.

19. The trailer light connector enclosure of claim 18 comprising a peel strip covering said adhesive, whereby said peel strip is removed prior to contacting said adhesive with the trailer for securing said enclosure housing to the trailer.

20. A trailer light connector enclosure for mounting on a vehicle and enclosing a trailer light plug receptacle provided on the vehicle wiring harness, said trailer light connector enclosure comprising a box-like enclosure housing sized to receive the trailer light plug receptacle; adhesive provided on said enclosure housing for attaching said enclosure housing to the vehicle; at least two openings provided in said enclosure housing for receiving that portion of the wiring harness attached to the trailer light plug connector; and a closure hingedly carried by said enclosure housing for releasably closing the trailer light plug receptacle inside said enclosure housing.

* * * * *